Patented Nov. 14, 1950

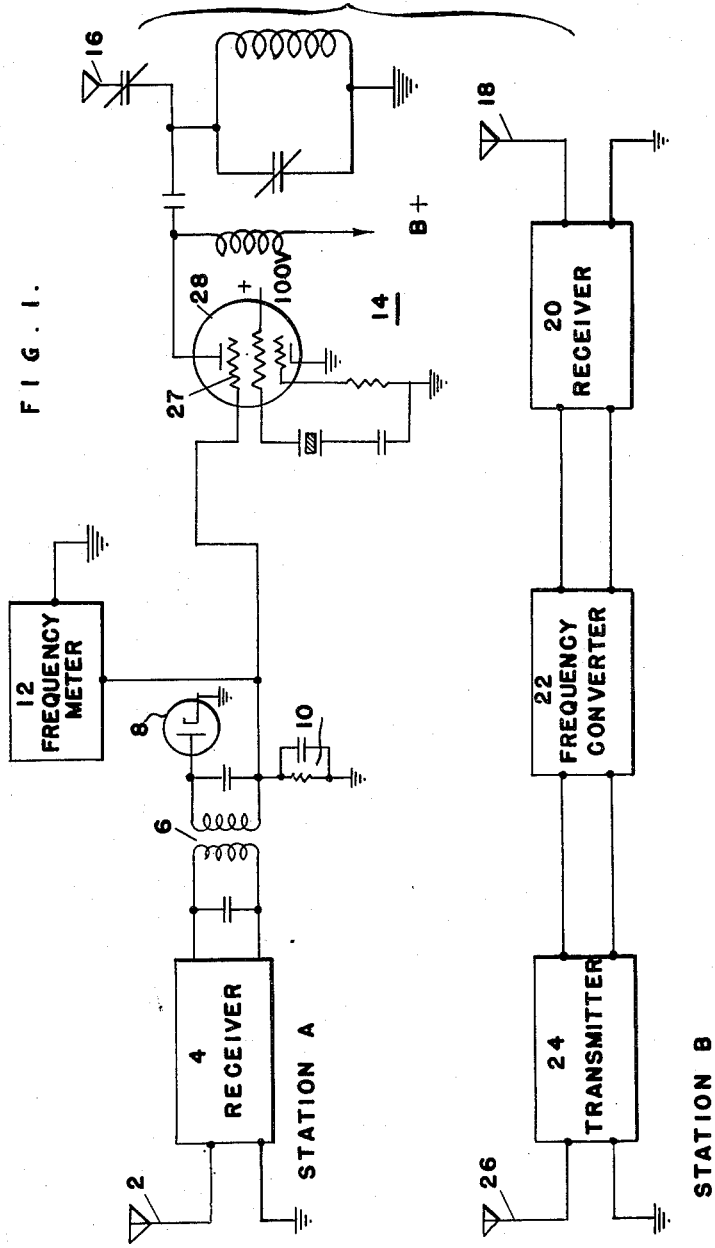

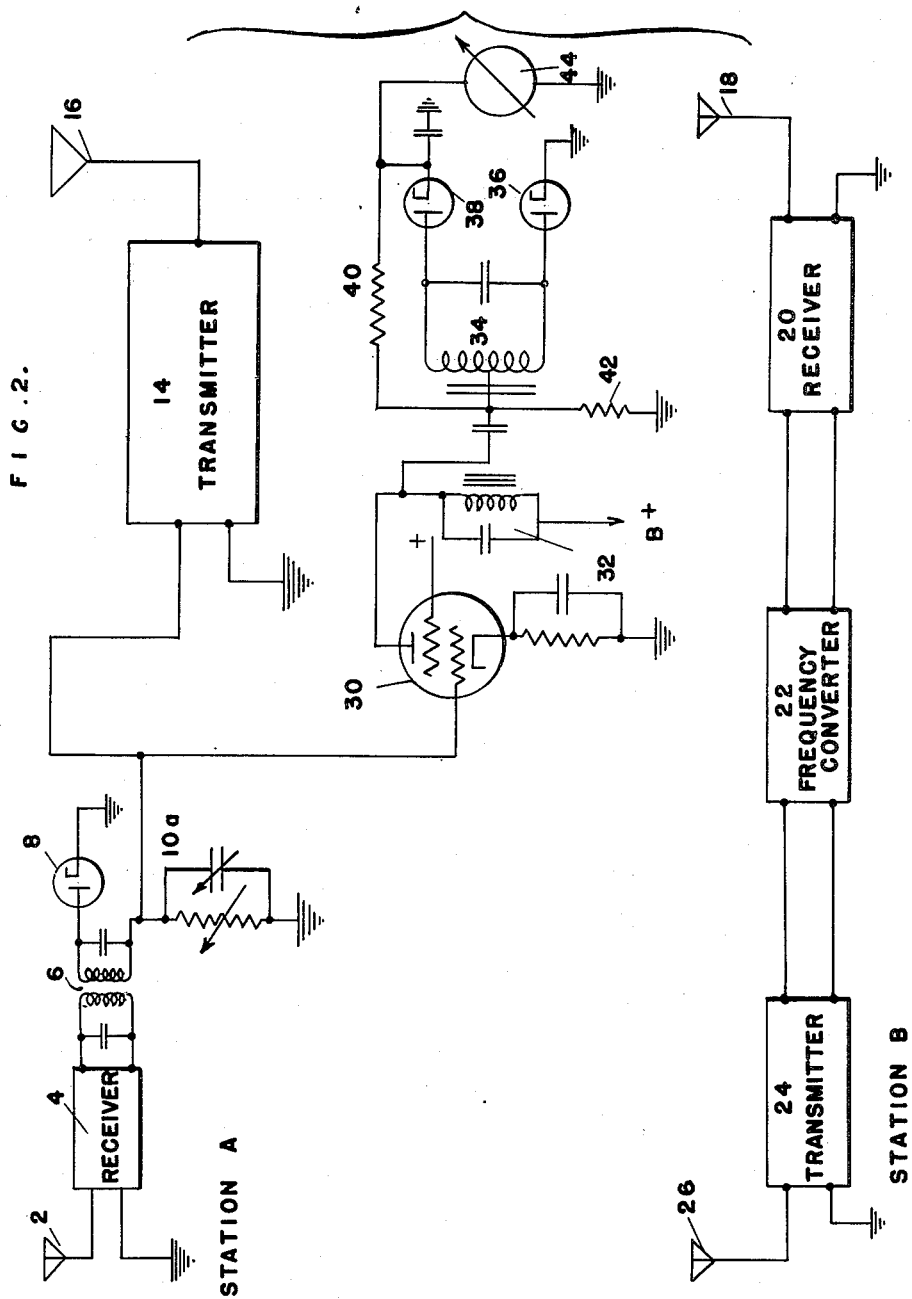

2,530,141

UNITED STATES PATENT OFFICE 2,530,141

ELECTRONIC DISTANCE INDICATOR AND THE LIKE

Carl Edward Atkins, Elgin, Ill., assignor to Tung-Sol Lamp Works, Inc., Newark, N. J., a corporation of Delaware Application September 22, 1944, Serial No. 555,298

4 Claims. (Cl. 343—13)

My present invention relates to methods and means for indicating distance, speed and approximate position of moving vehicles, for example airplanes. As radio waves travel with finite speed, that of the velocity of light, the time of transit of a radio signal from one point to another and back to the first point, neglecting any time delay introduced by the apparatus at the two points, is a linear function of the distance between the points. The rate of change of this time of transit, provided one point is moving toward or away from the other, is thus a function of the speed of the moving point. Thus if the location of one point is known, the distance therefrom of the other point, and its speed of movement toward or away from the fixed point can be determined from measurements of the transit time.

In accordance with the invention advantage is taken of this above described general relation of transit time to distance to provide a method and means whereby a visual or other indication of the distance between a moving vehicle and a fixed station may be obtained. One station transmits energy to the other station, which latter station after reception and frequency conversion retransmits the energy to the first station. Apparatus at the first station, responsive to the reception of the retransmitted signal, yields the distance indication.

For a better understanding of the invention, reference may be had to the accompanying drawings, of which Fig. 1 is a diagram of cooperating equipment at two stations for giving at one of the stations an indication of the distance from the other station and representing one embodiment of the invention; and Fig. 2 is a similar diagram of cooperating equipment at two stations but illustrating another embodiment of the invention.

As shown in Fig. 1 the equipment at station A, the station of origin of the signal, includes a receiving antenna 2 and a receiver 4 of any suitable design feeding through a radio frequency transformer 6 to a diode rectifier 8 and associated load network 10. The equipment at station A includes also a frequency meter 12, a transmitter 14 and transmitting antenna 16. At station B the equipment comprises a receiving antenna 18 tuned to the frequency of transmitting antenna 16 of station A, a receiver 20, frequency converter 22, transmitter 24 and transmitting antenna 26.

As shown in Fig. 1, the suppressor grid 27 of the transmitting tube 28 of transmitter 14 is connected to circuit 10. Thus when a strong signal is applied to diode 8 the rectified voltage appearing across the network blocks the transmitter. When no signal is received by receiver 4 transmitter 14 operates and transmits a carrier to receiver 20 at station B. This signal is changed in frequency by frequency converter 22 and fed to transmitter 24, which may be simply a high power radio frequency amplifier. Energy radiated by transmitting antenna 26 is picked up by receiving antenna 2 and delivered to receiver 4 at station A, causing a voltage to be developed across network 10. As previously indicated, this voltage blocks transmitter 14, whereupon transmitting antenna 16 ceases to radiate and no energy is retransmitted from station B and none is picked up by antenna 2. The voltage developed across network 10 decays and subsequently transmitter 14 starts operating again. An end to-end oscillation is thus established in the system, the frequency of which is a function of the time delay in the apparatus at the two stations and of the distance between the stations.

By proper design the time delay at station B and in most of the equipment of station A can be made negligible. If a resistor-condenser load network such as indicated at 10 is used, it will contribute the principal time delay. Network 10 might consist of a one hundred thousand ohm resistor with a shunt condenser as low as twenty five micromicrofarads giving a time constant of two and one-half microseconds. Thus, if the time delay in the intervening space were zero, that is if the stations were close together, the system would oscillate at a frequency in the neighborhood of four hundred kilocycles per second. When the stations are some distance apart, say fifty miles, the time delay would be increased to approximately one-half millisecond corresponding to a frequency of two kilocycles. Thus measurement of the frequency of oscillation of the system, as by the frequency meter 12 connected to network 10 at station A, is a measure of the distance between the stations. Obviously the frequency meter 12 would be suitably calibrated to give readings directly in distance rather than in frequency.

The embodiment of the invention illustrated in Fig. 2 differs from that of Fig. 1 in that the frequency of oscillation of the system is maintained constant and the distance indication obtained from the amount of time delay required to be introduced into the system in order to maintain such constant frequency. The equipment at the two stations in Fig. 2 differs from that of Fig. 1 only in the substitution of an adjustable load network 10a for the fixed network 10 of Fig. 1 and in the employment of amplifier and frequency discriminator circuits instead of the frequency meter 12 of Fig. 1. As shown, the amplifier comprises a tube 30 having its control grid connected to network 10a and its tuned plate circuit 32 forming part of the discriminator circuit, which in the embodiment illustrated is the well known Seeley circuit, including the tuned circuits 32 and 34 inductively and conductively coupled together, the diodes 36 and 38 with their anodes connected to opposite ends of circuit 34 and cooperating with series connected resistors 40 and 42. A voltmeter 44 is connected to indicate the direct current output potential of the discriminator circuit.

In employing the above described arrangement for distance measurement, the circuits 32 and 34 are first tuned to the frequency to be maintained, preferably the lowest possible frequency to which the system will respond. The network 10a is then adjusted manually or automatically to vary the interposed time delay until the frequency of the end-to-end oscillator comprising the cooperating equipment at stations A and B and the intervening space is that to which the circuits 32 and 34 are tuned, that is, circuit 10a is adjusted until the reading of voltmeter 44 is zero. The amount of time delay introduced into the system by circuit 10a in order to reduce the frequency to that to which the discriminator circuit is tuned, is thus a measure of the distance between the stations. If the adjustment of network 10a is effected by varying the resistance of the circuit, the resistor could be suitably calibrated to give readings directly in distance. Similarly, if the capacity is varied to make the adjustment, suitable calibration of the condenser dial would be made. The operator at station A could manually adjust the constants of circuit 10a or, if desired, the voltmeter 44 could be provided with known means for automatically adjusting the network when the voltmeter reading departs from zero.

From the above description of Figs. 1 and 2 it will be apparent that the invention provides a method of and means for determining the distance between two stations. If the location of either station is known, either station may take a bearing on the other and then from such bearing and from the determination of the distance between the stations, the exact location of the other station may be determined. Also, if one station is on an airplane, for example, and the plane is flying towards or away from the station, the rate of change of frequency of oscillation of the system will be a measure of the ground speed of the plane.

The following is claimed:

1. The method of measuring the distance between two stations by the time of travel of electromagnetic waves therebetween and the known time delay characteristics of the instrumentalities employed, which includes transmitting electromagnetic wave energy at one frequency from one station to the other, receiving and retransmitting the received energy at the latter station at a different frequency to the first station, receiving the retransmitted energy at the first station and applying it to the transmitter to interrupt continuing transmission, repeating said procedure, varying the time delay characteristics of an element at a station during movement of one station relative to the other to maintain constant the rate of interruption of transmission, and determining the changing distance between stations from the introduced variation in the time delay of such element.

2. A system for measuring the distance between stations which comprises electromagnetic wave receiving and transmitting means at each station, means at one station coupling the receiving and transmitting means together for operation of the transmitting means only during reception by the receiving means, and means at the other station for blocking transmission by the transmitting means of that station during reception by the receiving means of that station, whereby an end-to-end oscillation is set up, and means at one station for varying the time of transit of energy passing through the system to maintain constant the frequency of oscillation of the system during movement of one station relative to the other.

3. A system for determining the distance between stations comprising at one station a receiver, a load network therefor, a diode connected in series with said network, having a known time constant, a transmitter including a tube having a suppressor grid connected to said network for suppressing operation of the transmitter when said diode passes current and at the other station a receiver for receiving energy from the transmitter of the first station, a frequency converter connected to said second receiver, and a transmitter connected to said converter for retransmitting to the first station energy received therefrom whereby end-to-end oscillation is set up in the system, and frequency determining means connected with said network.

4. The system according to claim 3 wherein said last mentioned means comprises a discriminator circuit and wherein said network includes calibrated variable elements for varying the time constant of the system to maintain a constant frequency of oscillation of the system irrespective of the distance between the stations said variation of the elements necessary to maintain such constant frequency being a measure of the distance between the stations.

CARL EDWARD ATKINS.

REFERENCES CITED

The following references are of record in the file of this patent:

UNITED STATES PATENTS

| Number | Name | Date |
|---|---|---|
| 1,945,952 | Nicolson | Feb. 6, 1934 |
| 2,076,724 | Jacquet et al. | Apr. 13, 1937 |
| 2,134,716 | Gunn | Nov. 1, 1938 |
| 2,333,688 | Shepard, Jr. | Nov. 9, 1943 |
| 2,405,239 | Seeley | Aug. 6, 1946 |
| 2,411,520 | Capen | Nov. 26, 1946 |

FOREIGN PATENTS

| Number | Country | Date |
|---|---|---|
| 813,404 | France | June 1, 1937 |
| 288,233 | Great Britain | Sept. 6, 1928 |
| 103,163 | Australia | Feb. 2, 1938 |